Dec. 22, 1942.   E. CHALLET   2,305,672

ELECTRIC KITCHEN RANGE

Filed Oct. 31, 1940

Inventor:
E. Challet
By E. F. Wendroth
Atty

Patented Dec. 22, 1942

2,305,672

UNITED STATES PATENT OFFICE 2,305,672

ELECTRIC KITCHEN RANGE

Etienne Challet, Bern, Switzerland, assignor of one-fourth to the firm Entreprises Electriques Fribourgeoises, Fribourg, Switzerland, a firm of Switzerland Application October 31, 1940, Serial No. 363,770
In Switzerland September 12, 1940

1 Claim. (Cl. 219—37)

The present invention relates to an electric kitchen range comprising an oven having an upper heat resistance in its top part, at least two heating plates disposed above said oven and provided each one with a contact plug, and plug boxes or like contact means on the oven adapted to engage said contact plugs.

In known apparatus of this type, the heat resistance on the oven is mounted to extend over the full width of said oven and, consequently, passes somewhere below the plug boxes or like contact means provided for engaging the contact plugs of the heating plates. This arrangement is open to the criticism that the said contact means are generally subjected to great heat which affects the elasticity of the clamping members. Particularly in cases of modern high power plates, the said contact means are heated to an excessively high degree, the result being a bad contact with all the inconveniences inherent to this fact.

The novel construction of this invention inherently eliminates the above and like deficiencies of known arrangements by providing a kitchen range wherein the upper heat resistance of the oven is mounted within a recess extending between the horizontal projections on the oven of the contact means which engage the contact plugs of the heating plates, so as to prevent said resistance from heating said contact means from below.

The accompanying drawing illustrates, by way of example, three embodiments of the invention.

Figure 1:
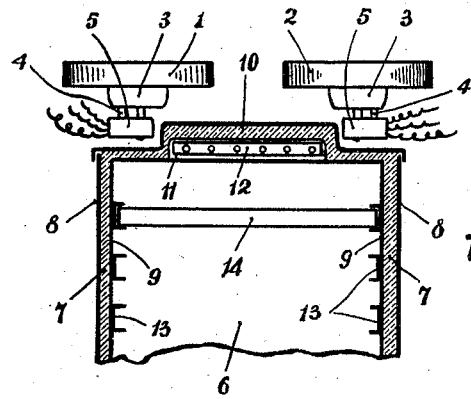
Figure 2:
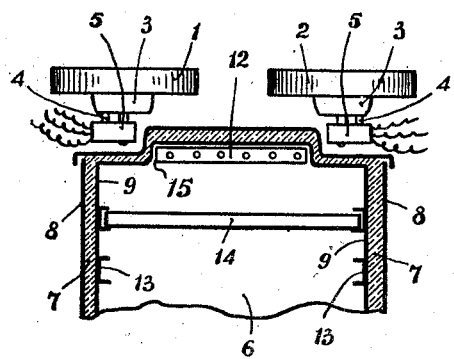
Figure 3:
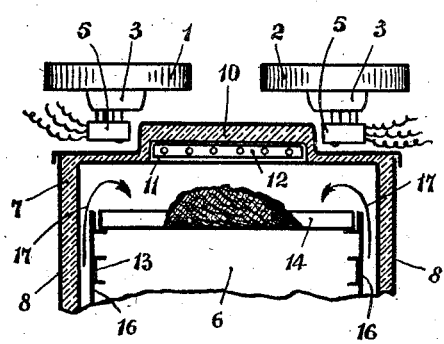

Fig. 1 is a transverse sectional view showing the first embodiment. Figs. 2 and 3 are similar views showing the second and third embodiment, respectively.

In the electric kitchen range illustrated in Fig. 1 the numerals 1 and 2 designate two heating plates each one being provided at its lower face with a contact plug 3 having fingers 4 adapted to penetrate into and contact with bushes of plug boxes or like contact means 5. The plates and the plug boxes are mounted in the upper part, not represented, of the casing of the kitchen range. Below the plates 1 and 2 is disposed an oven 6 the wall of which is constructed of insulating material 7 fitted between an outer metal lining 8 and an inner metal lining 9. The oven is shown having on its ceiling an elevated portion 10 extending between the plugs of the plates 1 and 2. This portion 10 has between the insulating sheet 7 with their inner lining 9 a space or chamber 11 adapted to receive the upper heat resistance 12 of the oven. 13 represent the slide ledges adapted to carry the baking trays 14 of the oven. In the present instance, the said ledges are shown fixed to the inside of the lateral walls of the oven.

It will be seen that the heat resistance 12 is mounted in a space extending between the horizontal projections on the oven of the plug boxes 5, the result of this arrangement being that said plug boxes are not directly heated by said resistance.

The embodiment shown in Fig. 2 is distinguished from that shown in Fig. 1 by the feature that the resistance 12, instead of being lodged in the ceiling of the oven, is mounted within a recess 15 formed by the cavity of the oven in said ceiling.

In the embodiment represented in Fig. 3 the slide ledges 13 carrying the baking trays 14 are not fixed to the inside of the lateral walls of the oven but are shown being secured to vertical supports 16 spaced at a small distance from said walls. In this way, the hot air flow traversing the zone between said supports and walls in the direction of the arrow 17 is brought into contact with the parts of the ceiling of the oven which lie on the right and left of the recess 11 so as to heat said parts, the result of this arrangement being a uniform distribution of heat on the whole inner surface of the oven.

It will be obvious that the above arrangement may be applied also to kitchen ranges according to the Fig. 2, wherein the heat resistance is disposed within a recess formed by the cavity of the oven.

While the represented examples show some preferred forms of the invention, it is understood that other constructions may be made which fall within the scope of the appended claim.

I claim:

In an electric kitchen range comprising an oven and a number of heating plates, a top insulating plate providing two lateral upper recesses for the location of the contact means of the heating plates and one central under recess for the location of the oven heating resistance, with the triple purpose to save space in height, to gain oven space in width and to avoid overheating of the contact means of the heating plates, and an adjustable oven tray extending on less than the full width of the oven, in order to get lateral air circulating spaces securing a more even temperature distribution.

ETIENNE CHALLET.